June 4, 1963
R. H. REX ET AL
3,092,440
INJECTION MOLDING METHOD
Filed Jan. 20, 1960
6 Sheets-Sheet 1
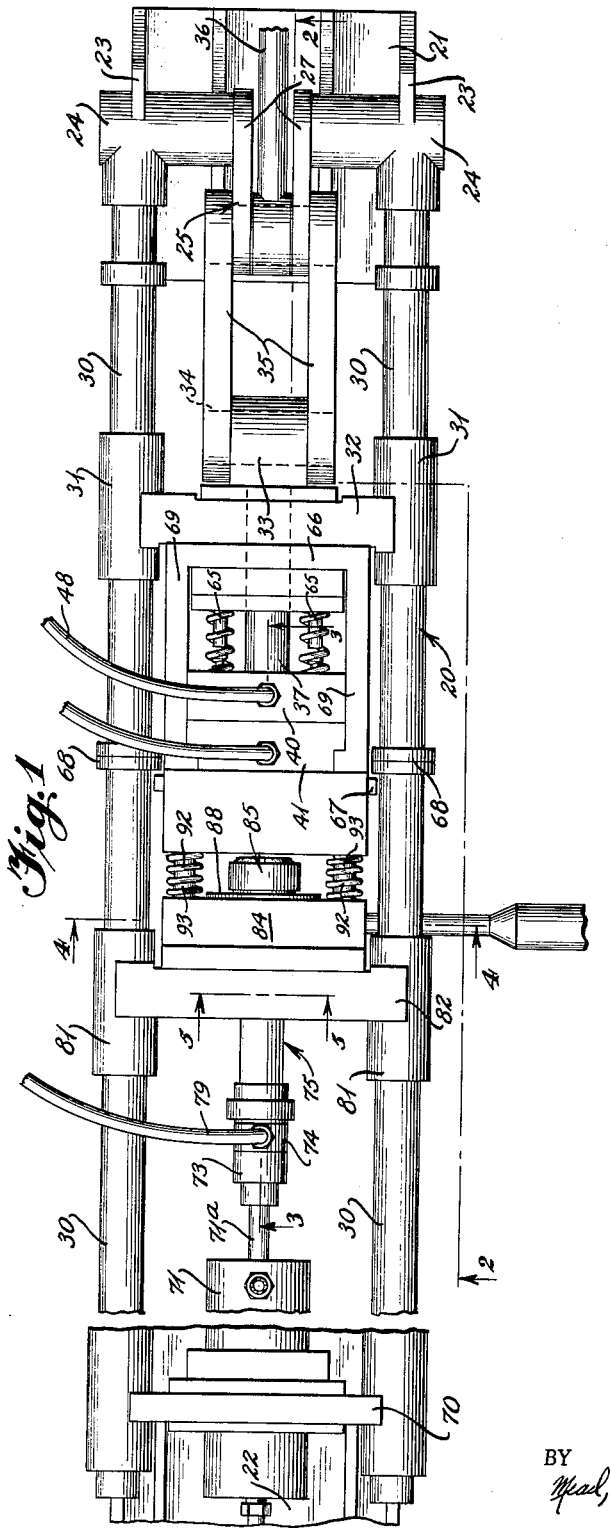
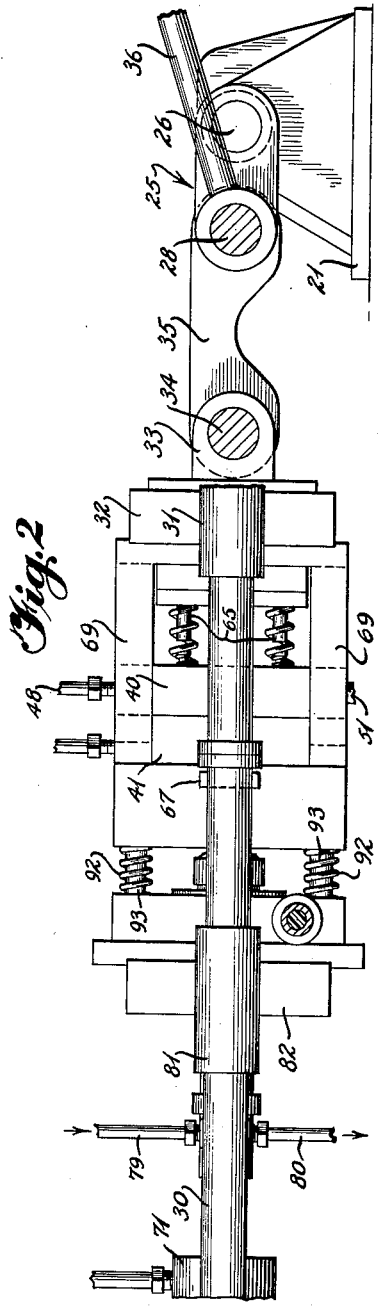
INVENTORS
Raymond H. Rex
Elmer L. Adams
BY
ATTORNEYS

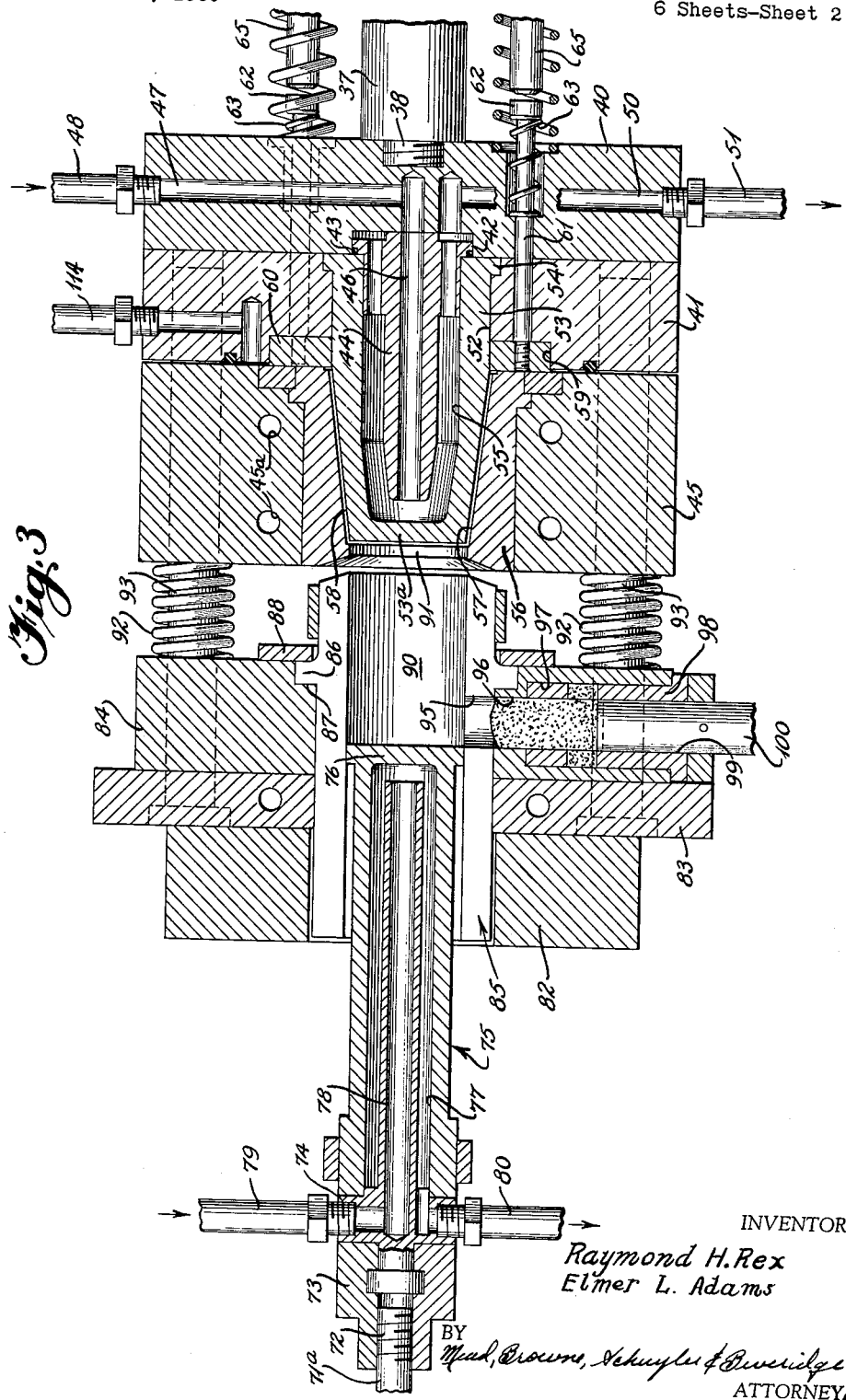

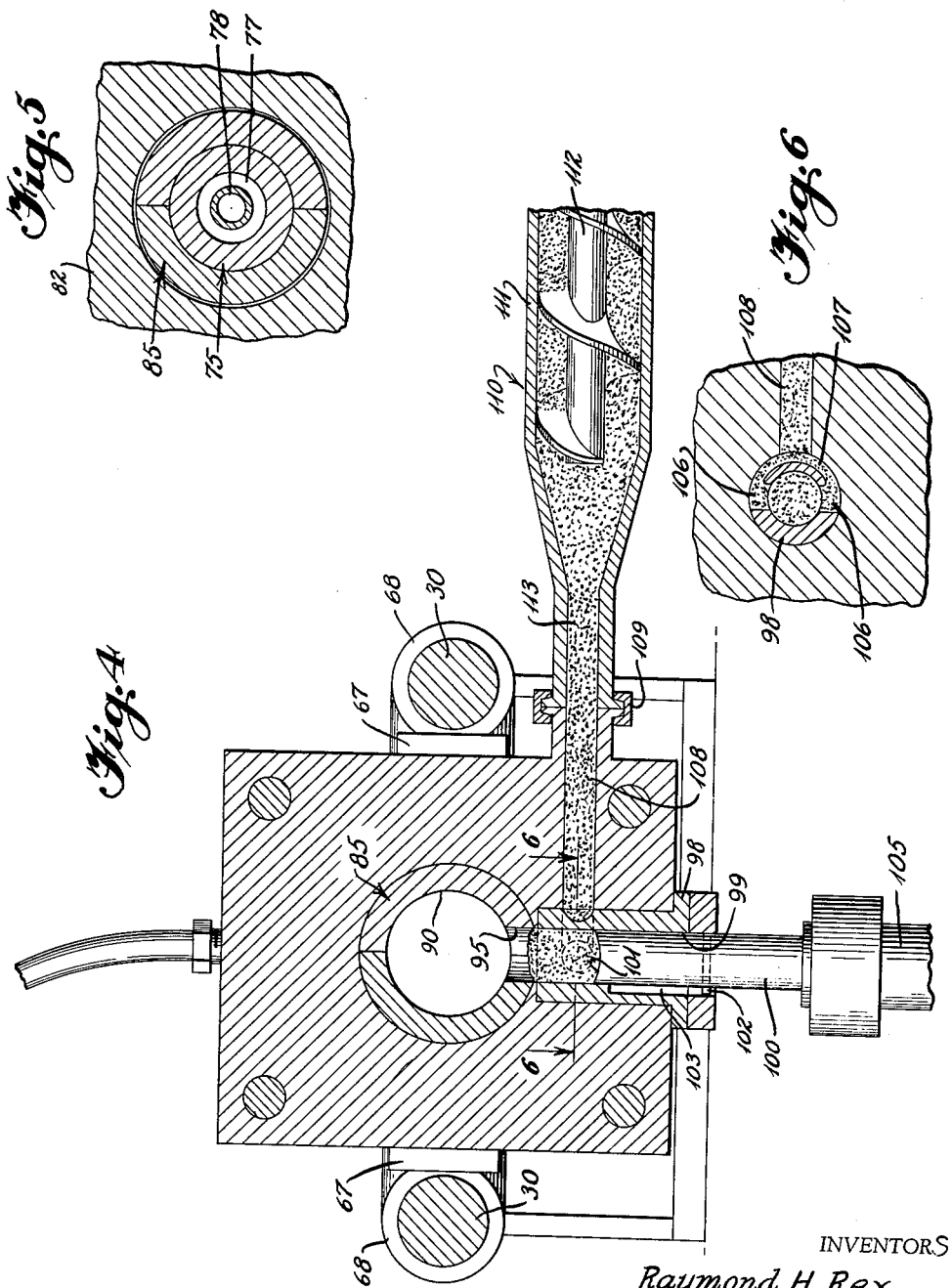

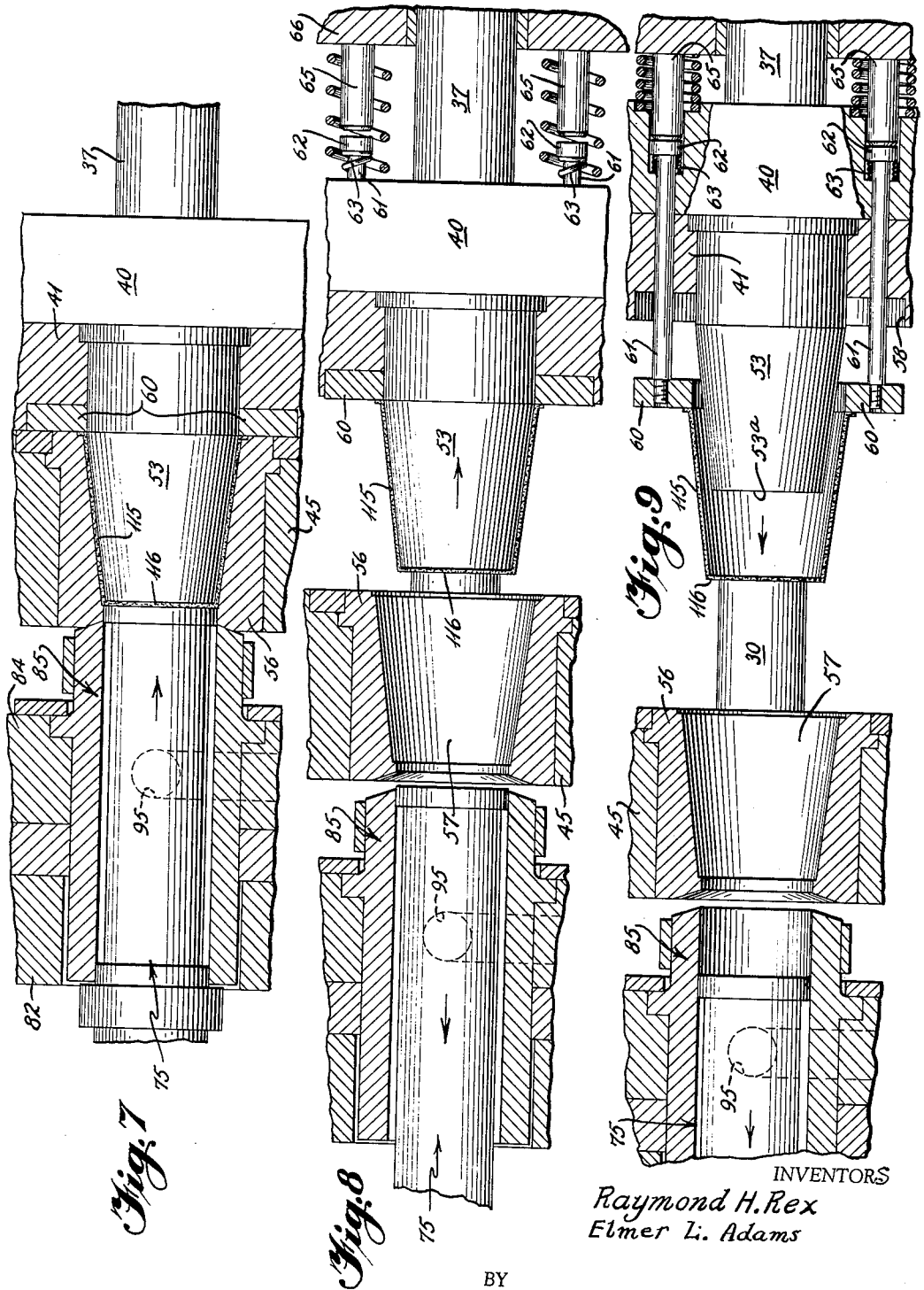

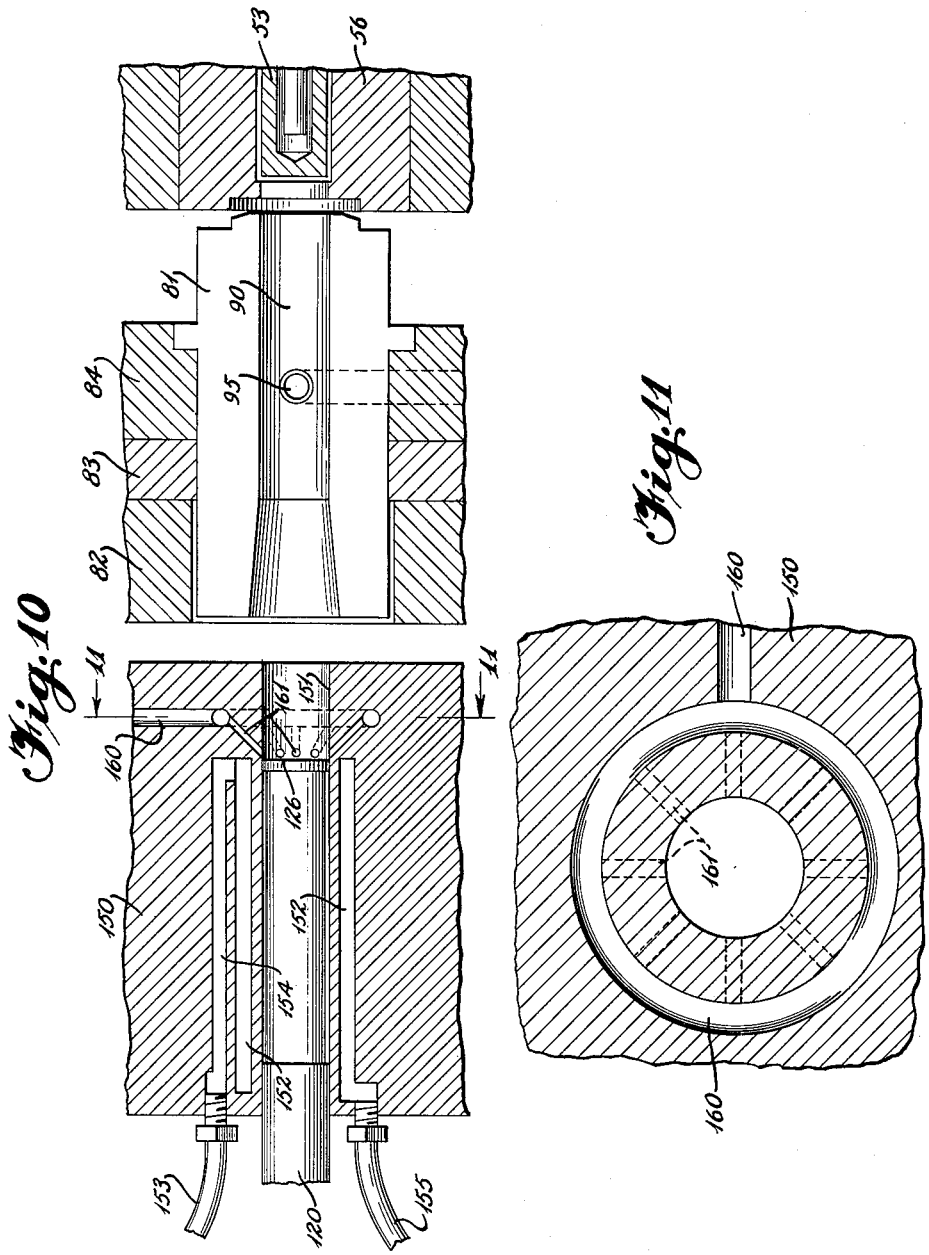

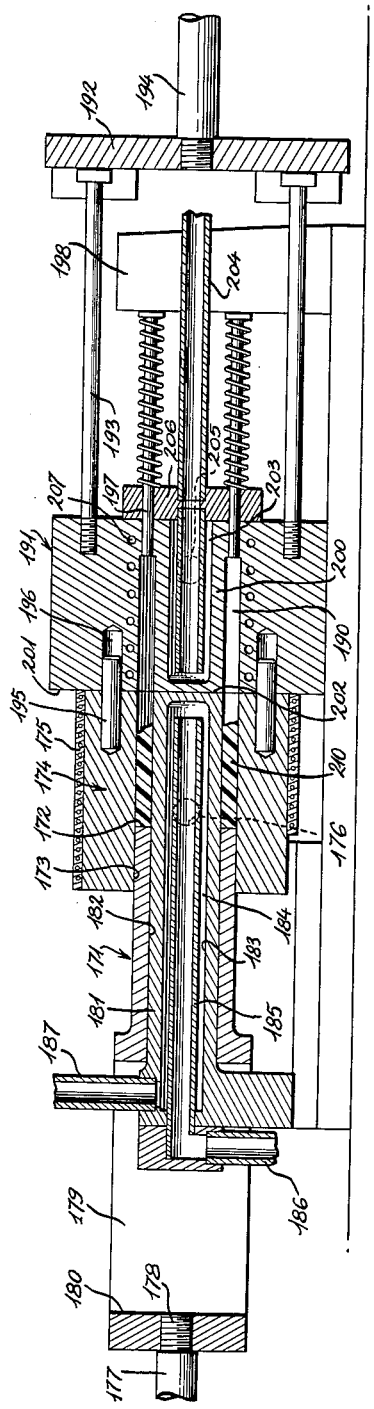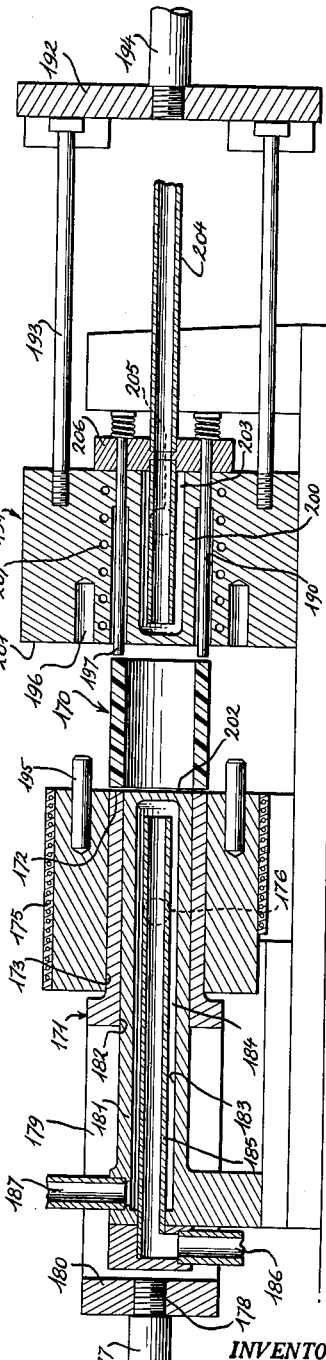

United States Patent Office 3,092,440
Patented June 4, 1963

3,092,440
INJECTION MOLDING METHOD
Raymond H. Rex and Elmer L. Adams, Toledo, Ohio, assignors to Owens-Illinois Glass Company, a corporation of Ohio
Filed Jan. 20, 1960, Ser. No. 3,592
1 Claim. (Cl. 18—55)

The present invention relates to an injection molding method, and more particularly to a plastic molding process for the low pressure, high speed injection molding of thermoplastic or thermosetting materials.

In conventional injection molding techniques, a plasticized plastic material is injected under extremely high pressures, generally ranging from about 12,000 to 30,000 pounds per square inch, into a mold cavity and this pressure is maintained until the material sets to its final form. As a result of the utilization of such pressures, injection molding machines have become increasingly bulky and expensive, and it has become necessary to maintain extremely fine tolerances in the molds per se and in the mating of matching mold surfaces to obviate the formation of flash in the molds and especially at the mold faces. In order to obtain the necessary output from such large machines operating at such high pressures, multi-cavity molds are conventionally utilized with sprues or runners being provided to interconnect the multitude of cavities. Such sprues are wasteful of material, increase the mold cost and complexity and require careful mold design to eliminate, so far as possible, excessive joining portions and flash interconnecting the parts.

The present invention provides an improved mode of operation for a machine operable at comparatively low pressures, for example, on the order of one to five thousand pounds per square inch, and operable automatically so that high speed production within single cavity molds can be obtained.

One feature of the present invention resides in the elimination of restricted openings through which plastic flow must be accommodated and which have been among the most frequent causes of extremely high pressures in prior art machines. The elimination of such restrictions is accomplished by the injection of the plastic material into the mold cavity by a relatively large injection piston operating in a plastic supply passage freely communicating with the mold cavity, the passage and the piston being preferably of substantially the same size as one dimension of the article being produced. Subsequent to injection and during the molding period, the piston forms a portion of the mold, the pressure face of the piston being contoured to conform to and define the one dimension of the molded article.

Another feature resides in the elimination of external or extraneous stops or limiting devices for the injection piston, the piston being stopped upon the material after filling of the mold, thus preventing incomplete filling of the mold when a light charge is introduced ahead of the piston and to prevent overfilling of the mold and the formation of a section of undue thickness when a somewhat larger charge of material is introduced ahead of the piston. Additionally, the charge of plastic material to the injection piston is metered with heretofore unobtainable accuracy.

To speed up the forming cycle, either, and preferably both, the injection piston and the mold is cooled by a circulatory fluid coolant. Not only is the molding cycle speeded up by the utilization of such coolant, but any sticking between the injection piston and the molded material is eliminated.

The process of the present invention may preferably include such steps as those of introducing a metered charge of plasticized plastic material in front of an injection piston, advancing the material into the mold cavity by means of the piston to fill the cavity, bottoming the injection piston on the material so as to maintain the material under the molding pressure exerted by the piston and at the same time forming a portion of the mold by the piston, and cooling the piston so as to prevent adherence between the piston and the material being molded.

It is, therefore, an important object of the present inventionto provide an improved method of low pressure, high speed injection molding of plastic material.

A further object of this invention is the provision of a process for the injection molding of plastic material by the subjection of the plastic material to relatively low pressures across an entire dimension of the molded article through a linearly displaceable piston which, during the molding operation, forms one of the mold parts.

Yet another important object of this invention is the provision of a process for the molding of plastic material in a restricted mold defined by cooperable elements, circulating a coolant fluid in heat exchange relation with the molding element to shorten the molding cycle, and bottoming a piston forming one of the molding elements against a carefully metered charge of plastic material introduced into the mold space.

Other objects and advantages of the invention will appear from the following detailed description taken in conjunction with the annexed drawings, in which, as shown on the drawings:

FIGURE 1 is a plan view of an apparatus for use in the present invention;

FIGURE 2 is a sectional view taken along the planes 2—2 of FIGURE 1;

FIGURE 3 is an enlarged sectional view, with parts shown in elevation, taken along the plane 3—3 of FIGURE 1;

FIGURE 4 is an enlarged sectional view taken along the plane 4—4 of FIGURE 1;

FIGURE 5 is a sectional view taken along the plane 5—5 of FIGURE 1;

FIGURE 6 is a sectional view taken along the plane 6—6 of FIGURE 4;

FIGURE 7 is a greatly enlarged fragmentary sectional view similar to FIGURE 3, illustrating one position of the apparatus during one phase of the molding cycle;

FIGURE 8 is a view similar to FIGURE 7 illustrating a successive position of the apparatus during a subsequent phase of the molding cycle;

FIGURE 9 is a view similar to FIGURE 8 illustrating yet another successive position of the apparatus at substantially the conclusion of the molding cycle;

FIGURE 10 is a fragmentary sectional view similar to FIGURE 3 illustrating a modified form of apparatus;

FIGURE 11 is an enlarged sectional view of the modification illustrated in FIGURE 10 taken along the plane 11—11 of FIGURE 10;

FIGURE 12 is a sectional view of a further modification of apparatus embodying the invention; and FIGURE 13 is a similar view showing parts of the apparatus positioned to strip the article from the mold cavity.

On the drawings:

The Embodiment of Figures 1 Through 9

In FIGURE 1, reference numeral 20 refers generally to one form of machine of the present invention capable of carrying out the process of the present invention.

Generally, this machine comprises separated first and second base plates 21 and 22, the first base plate 21 being provided with upstanding spaced ears 23 provided with opposing inwardly directed bearings 24 in which are journaled a crank shaft indicated generally at 25. This crank shaft 25 comprises laterally outwardly directed, transversely spaced shaft portions 26 journaled in the bearings 24 and joined through spaced, parallel, longitudinal arms 27 to a transversely extending throw shaft 28. The base plates 21 and 22 are joined by longitudinally extending parallel guide rods 30 upon which are disposed slideable guide sleeves 31 joined by a transverse guide block 32. Secured to this guide block is a housing 33 journaling a transverse actuating shaft 34 joined to the throw shaft 28 by transversely spaced connecting arms 35. The crank shaft 25 is adapted to be actuated by suitable means, as by an actuating piston rod 36 connected to a suitable source of power such as, for example, a fluid pressure actuated piston. Reciprocation of the rod 36 moves the throw shaft 28 arcuately about the shafts 26, and the block 32, longitudinally guided by the rods 30, reciprocates with the throw shaft.

Carried by the guide block 32 is a longitudinally projecting actuating rod 37 threaded at its forward end 38 (FIGURE 3) to a reciprocating coolant supply block 40. This block 40 is in full face-wise abutment with a medial mold block 41, and the medial block 41 is, when in its illustrated position of FIGURE 3, in close proximity to a mold cavity block 45 internally cooled by circulation of coolant through passages 45a. The coolant block 40 is provided at its front face with a central recess 42 adapted to receive an enlarged peripheral flange 43 of a mold coolant core 44, this coolant core having a central inlet bore 46 communicating with a radial inlet passage 47 formed in the coolant block 40 and adapted to receive a fluid coolant, such as water, from an external source through a line 48. The coolant core 44 also communicates through a plurality of radially spaced longitudinal bores 49 with a radial coolant passage 50 formed in the coolant block 40 communicating with a drain line 51. The medial block 41 is provided with a central bore 52 terminating in a radially directed shoulder against which is seated a peripheral flange 54 at the rear end of a mold core 53 into which the coolant core 44 projects axially. The mold core 53 is provided with a central recess 55 which cooperates with the reduced periphery of the forward end of the coolant core 44 to provide a water coolant passage in good heat exchange relation with the core.

The mold block 45 is provided with an axially extending mold insert 56 having an interior cavity 57 cooperating with the mold core 53 to define partially the actual mold space 58.

The medial block 41 is provided with an inner peripheral recess 59 within which is seated an annular stripper plate 60. This stripper plate 60 is threadedly secured to a plurality of radially spaced, elongated stripper rods 61 projecting rearwardly through the plate 40 and provided with enlarged heads 62 positioned therebeyond. A relatively light compression spring 63 aids in normally maintaining the stripper plate 60 in its retracted illustrated position of FIGURE 3 within the recess 59.

A plurality of stripper actuation rods 65 are carried by and forwardly project from a stripper block 66 having lateral abutments 67 (FIGURE 1) carried by the mold block 45 for contacting fixed collars 68 on the guide rods 30, the medial block 41 and the stripper block 66 being interconnected by parallel arms 69 between which the plate 40 is reciprocable by the shaft 37.

Carried by the base plate 22 is a fixed bracket 70 supporting a longitudinally extending fluid pressure actuated cylinder 71, the actuating rod 71A of which projects forwardly intermediate the rod 30, this rod 71A having its forward end fixedly secured, as by threads 72, to a piston block 73 joined (FIGURE 3) through a coolant block 74 a generally cylindrical molding piston indicated generally at 75.

This molding piston 75 is provided with a forward face 76 and an interior coolant circulation recess 77 into which projects a coolant supply pipe 78 adapted to receive a fluid coolant, such as water, through an inlet line 79 communicating with the coolant block 74, the annular space between the pipe 78 and recess 77 communicating with a drain line 80.

Disposed on the guide rods 30 are a pair of guide or slide bushings 81 joined by a transverse plate 82 having its forward face in face-wise abutment with a spacer block 83 which is interposed between the plate 82 and a supply block 84. The plate 82 and the blocks 83 and 84 are provided, respectively, with axially aligned apertures adapted to receive therein a generally cylindrical piston bushing 85 formed in two semi-cylindrical halves and provided with a radially enlarged arcuate flange 86 secured in an enlarged recess 87 on the front face of the block 84 by a cover plate 88.

The piston bushing 85 is provided with a cylindrical axial bore 90 open at either end and into which the piston is reciprocable upon actuation of the cylinder 71, this passage 90 communicating fully with the terminal open end 91 of the mold recess or space 58.

Interposed between the mold block 45 and the block 84 are a plurarlity of compression springs 92 mounted on guide rods 93, the rods 93 being carried by the block 83 to project through aligned apertures of the blocks 84, 45 and 41. The rods 93 serve primarily to align the blocks 84 and 45, and more particularly to align the bore 90 and the mold space opening 91.

The compression springs 92 serve to urge the block 45 from the block 84 during the stripping cycle, thus reducing heat transfer between the insert 56 and the bushing 85. Such movement of the block is limited by abutment of the abutments 67 with the collars 68, the resultant separation of the insert 56 and the bushing 85 being shown in FIGURES 1 and 3.

The piston bushing 85 is provided with a radial opening 95 communicating with a vertically extending bore 96 formed in the supply block 84 and radially enlarged, as at 97 to receive therein a sleeve 98 having a central bore 99 aligned with the bore 96 and adapted to receive therein an axially slideable charging piston 100. This charging piston 100 has an upper base arcuately recessed, as at 101 (FIGURE 4), to mate with the bore 90 of the piston bushing 85, and to preserve the alignment between the recess 101 and the contour of the bore 90, the piston 100 carries a radial guide pin 102 entered in an axial slot 103 in the bushing 98.

The piston 100 is vertically reciprocable by suitable means, as by the piston rod 105 of a fluid pressure actuated cylinder (not shown) to open and close a pair of diametrically opposed apertures 106 formed in the bushing 98 and communicating with an arcuate peripheral recess 107 also formed in the bushing. This recess 107 communicates with a plastic material inlet line 108 projecting radially of the bore 99. The bore 99 is joined, as through a peripheral lock ring 109, to the outlet end of a plasticizer indicated generally at 110. Preferably, a combined plasticizer-extruder is utilized having a cylindrical casing 111 within which a rotatable screw 112 advances the plastic material. The molding cavity is evacuated prior to injection of plastic material by a vacuum line 114.

*Operation of Figures 1 Through 9*

The operation of that embodiment of the present invention illustrated in FIGURES 1–9, inclusive, can be best understood by a comparison of FIGURES 3, 7, 8 and 9 which illustrate the desired sequence of operation for carrying out the method of the present invention.

In the relative positions of the elements as illustrated in FIGURE 3 of the drawings, the piston 75 is withdrawn to uncover the supply port 96, the supply piston 100 is actuated downwardly by retraction of the actuating rod 105 to uncover the opposed radial supply ports 106. Actually the piston 75 is preferably withdrawn completely out of the bushing 85 to prevent heat transfer therebetween to (1) overheat the piston or (2) undercool the bushing. In either event, the ram may bind in the bushing. Consequently, the extruder 110 discharges through the aligned passages 113 and 108 and through the arcuate passage 107 into the supply opening 99.

When sufficient material has accumulated in the supply passages 99 and 96, preferably as determined by a timer control, the piston 100 is actuated upwardly to deposit the plasticized material in the bore 90 of the piston bushing 85. As the piston 100 is displaced upwardly, it first passes over the radial supply ports 106 to cut off the further introduction of plastic material through the ports 106 to the supply passages 99 and 96 and also, the piston 100 displaces the plasticized material through the passages 99, 96 and 95 into the bore 90 ahead of the front face 76 of the piston 75.

Next, the piston 75 is advanced by actuation of the fluid pressure cylinder 71 to displace the plasticized material forwardly into the mold space 58 defined intermediate the inner periphery 57 of the mold insert 56 and the exterior periphery of the mold core 53. The filling of the mold space 58 occurs during forward displacement of the piston from its position of FIGURE 3 to its position of FIGURE 7 and, when the piston 75 gets to its forwardmost position, the bottom of the mold space 58 is defined by the forward face 76 of the piston.

It will be noted that there are no external stops for the piston 75 and that it is stopped solely by the compressive resistance of the plastic material filling the mold space 58. This constitutes an important feature of the present invention, since it substantially nullifies the effect of overcharging or undercharging of plasticized material by the piston 100. If less than a complete charge is made, the spacing between the forward face 76 of the piston 75 and the radial face 53A of the mold core 53 will merely be reduced, and the mold space 58 will still be completed with the finished article 115 having a bottom 116 (FIGURE 9) of less than nominal thickness. If an overcharge is introduced, the spacing between the mold faces 76 and 53A will be increased and the thickness of the article bottom 116 will merely be increased. The force on the piston can thus remain constant, the plastic material is uniformly compacted, and any variations from the nominal charge of material can be accommodated without either voids or flash in the finished article.

Further, it will be noted that the diameter of the front face 76 of the piston 75 is substantially the same as the diameter of the bottom 116 of the article 115 and that the plastic material need not be expressed through any reduced apertures into the mold space 58, thereby substantially reducing the pressures necessary to fill the mold space. Also, the radial piston face is contoured to conform to the wall 116 of the finished article 115.

When the position of FIGURE 7 is attained, the article 115 assumes its final configuration and the article is chilled by the coolant circulated within the piston 75 and also within the mold core 53. This circulation of coolant not only effects the immediate solidification of the plastic material to the configuration of the mold space 58, but also causes the chilling of a thin skin of plastic material at the front face 76 of the piston 75, thereby preventing adherence between the face 76 and the plastic material. Actually, coolant is constantly circulated through the piston passage 77 and adherence of the plastic material to the piston is prevented even during the displacement of the material through the bore 90 into the mold spaces. Accordingly, the piston 76 can be immediately withdrawn without pulling any of the plastic material with it and without ruining the bottom 116 of the article 115.

After the molding step of FIGURE 7 has been completed, the actuating rod 36 is retracted to move the crank shaft 28 arcuately about the pivot shaft 26, thereby retracting the block 32 and the rod 37. Consequently, the blocks 40 and 41 will be retracted, carrying with them the mold core 53 and the article 115 disposed on the core. The piston 75 will be simultaneously retracted to the left by its cylinder 71. Initial separatory movement because of the springs 92 spaces the insert 56 and the bushing 85 to reduce heat transfer therebetween.

Initially, the annular stripper 60 will be displaced to the right along with the blocks 40 and 41 until such time as the enlarged stripper pin heads 62 abut the stripper rods 65 rigid with the fixed stripper block 66 to hold the stripper 60 fixed axially while the core 53 is withdrawn axially therethrough. The front face of the stripper 60 abuts the article 115 and consequently will prevent travel of the article 115 with the core 53. Accordingly, the stripper is effective to remove the article from the core as best illustrated in FIGURE 9 of the drawings. After the article 115 has been stripped from the core, it falls of its own weight intermediate the blocks 41 and 45 and is thereby removed from the machine. The piston 36 is again advanced to its position of FIGURE 1, and the piston 75 is returned from its retracted position of FIGURE 3 whereupon another injection of plastic material occurs. The concurrent and opposite movements of the mold core 53 and the injection piston 75 appreciably reduce the overall cycle time.

The cycle is then repeated.

The Embodiment of Figures 10 and 11

In FIGURES 10 and 11 of the drawings, there is illustrated another embodiment of the present invention wherein the injection piston is cooled by retraction into a cooling chamber axially aligned with but exposed exteriorly of the feed bushing through which the plastic material is fed to the molding chamber. The purpose of the exterior cooling chamber is to better adapt the structure to the molding of easily chilled thermosetting materials having a narrow melting point range and which are normally rather difficultly moldable.

Referring now to FIGURE 10, it will be seen that disclosed therein is a structure which is substantially the same as that disclosed in FIGURE 3, particularly in reference to the guide bushings 81, the transverse plates 82, the spacer block 83 and the supply block 84. The bushings 81 cooperably define the axial bore 98 into which a solid piston 120 substantially identical with the solid piston 75 of FIGURES 10 and 11 is reciprocable to feed plastic material picked up from the supply passage 95.

The piston 120 is effective to transfer plastic material from the supply passage 95 into the mold space defined between the internal mold core 53 and the surrounding mold insert 56. These remaining portions of the apparatus 12 are substantially identical with those previously described.

The piston 120 is illustrated as withdrawn into a cooling block 150 positioned adjacent to, but spaced from, the bushing halves 81 and having an internal bore 151 aligned with the bore 90 and adapted to receive the piston 120 when it is fully withdrawn. The block 150 is cooled by means of a cylindrical coolant passage 152 receiving fluid under pressure from a suitable source of coolant, through a conduit 153 communicating with inlet passage 154, the coolant being removed through an exhaust passage 155 communicating with the cylindrical passage 152.

It will be noted that the passage 152 is in close heat exchange relationship with the piston 120 when it is fully withdrawn to its position illustrated in FIGURE 2 and that a substantial coolant effect will be exerted upon the piston 120. A further coolant effect is obtained by the circulation of a gaseous coolant introduced through a radial gas passage 160 communicating with the bore through a plurality of inclined passages 161. These passages 161 are inclined toward the free face 126 of the piston and serve to cool this face when the piston 120 is in its fully retracted position.

The operation of the embodiment illustrated in FIGURES 10 and 11 will be readily appreciated, since the only material change resides in the lengthening of the stroke of the solid piston 120, so that the piston will retract completely out of the bushing 81 into a coolant block 150. Thus, the bushing can be heated to the working temperature of the plastic material introuced thereonto through the supply conduit 95 without being in extended heat exchange relation with the piston 120.

The piston 120, by virtue of its complete retraction out of the bushing 81 and into the coolant block 150, will be chilled. An additional chilling effect will be exerted by cold air or other gas blast directed across the face of the piston 126 to facilitate the cooling of that surface. The only dwell of the piston 120 is in its illustrated position of FIGURE 10. The prechilled piston is merely inserted through the bushing 81 during the molding cycle to pick up and displace the plastic material into the mold space intermediate the core 53 and the block 56.

Since cooling is accomplished by heat transfer from the outside surfaces of the piston, the piston may be made of materials other than metal, so as to minimize metal-to-metal wear during continual operation of the apparatus.

The Embodiment of Figures 12 and 13

In FIGURES 12 and 13 of the drawings, there is illustrated a further embodiment of the present invention. In the embodiments of FIGURES 1 through 11, previously described, the apparatus and method have been utilized to form cup-shaped members having bottom walls against the bottom of which the injection piston terminal face 76 (FIGURE 3) or 126 (FIGURE 10) is positioned during final forming of the article. The invention herein described can also be readily adapted to the formation of tubular articles of any desired cross-sectional configuration, such as a sleeve 170 (FIGURE 13), by the utilization of an injection piston 171 having an annular terminal face 172.

More specifically, as fully illustrated in FIGURES 12 and 13, the piston 171 is reciprocable within a cylindrical passage 173 formed in a feed block 174, preferably heated by peripheral electrical resistance heating elements 175. The passage 173 is bored from the block 174 and communicates with the supply passage 176 to which plasticized material is supplied by a charging piston as illustrated in FIGURES 4 and 11.

The injection piston 171 is reciprocable by suitable power means, as by a cylinder (not shown) having an actuating rod 177 threaded or otherwise suitably joined at 178 to an integral piston frame 179 provided with a slot 180. This slot or opening 180 is provided to accommodate reciprocation of the piston 171 relative to a fixed cooling or guide block 181 extending axially of the piston to be received by a piston bore 182. The block is provided with a central axially elongated recess 183 which provides a coolant space 184 interiorly of the guide block 181 and communicating through an axial supply pipe 185 and a radial connection 186 with a suitable source of heat exchange fluid, such as water. Egress of heat exchange fluid is provided by a second radial connection 187 connected to a sump, drain or the like. The piston 171 is internally cooled by its interior peripheral sliding contact with the coolant block 181 while heated plasticized material is supplied in advance of the piston face 172 through the charging aperture 176 to the annular space intermediate the cooling block 181 and the feed block bore 173. Of course, movement of the piston face 172 across the aperture 176 will cut off the supply of plasticized material to this supply space, as hereinbefore described in the other embodiments of the present invention.

A cylindrical mold cavity 190 is provided by a recess formed in a mold block 191 joined to and carried by a mounting block 192 by rods 193. The carrying block 192 is joined to suitable actuating means, such as the actuating rod 194 of a hydraulic cylinder (not shown).

The mold block 191 is aligned with the feed block 174 so that the mold cavity 190 communicates fully with and is axially aligned with the feed block bore 173 by means of aligning pins 195 secured to and carried by the feed block 174 and enterable into aligned recesses 196 in the mold block. Also carried by the mold block 191 in alignment with the mold cavity 190 are a plurality of stripper pins 197 spring urged to their retractive positions of FIGURE 12 in abutment with a fixed stripper block 198.

The interior peripheral surface of the mold cavity 190 is formed by a core projection 200 formed integrally with the mold block and terminating flush with the forward face 201 of the mold block. This core portion 200 abuts with the forward face 202 of the coolant block 181 when the mold block 191 and the coolant block 174 are in their mold-closed positions of FIGURE 12.

The mold cavity core portion 200 is cooled internally, the core portion having an internal recess 203 into which coolant is introduced from a suitable source, as through conduit 204, and from which coolant is removed for an egress passage 205. Since the cavity 203 is open at its rear end it is closed by a fixed mounting block 206 abutting the rear face of the mold block 191 to provide an additional bearing surface for the stripper pins 197 and to provide a support for the conduit 204. If desired, heat exchange fluid may also be circulated through the mold block 191, as through internal passages 207. Desirably, a cooling medium is circulated through these passages 207 to further reduce the forming cycle of plasticized material introduced thereinto.

The operation of the embodiment of FIGURES 12 and 13 will be readily appreciated by a comparison of FIGURES 12 and 13. In FIGURE 12 the piston 171 is illustrated in its retracted position at which the supply port 176 is uncovered to accommodate the entry of plasticized material 210 into the annular supply passage provided intermediate the supply block 174 and the coolant block 181 in advance of the piston face 172. Forward actuation of the piston 171 will interrupt the supply of plasticized material as the piston covers a supply port 176 and will express such material to the right (as illustrated in FIGURE 12) into the mold cavity 190. Filling of the mold cavity and actual forming of the article 170 nominally occurs when the piston 171 is fully entered into the supply passage so that the face 172 of the piston is aligned with the forward face of the supply block 174. However, since the piston is bottomed solely against the material 210, an oversupply of material may halt movement of the piston prior to its attainment of this exact position and, conversely, an undersupply of material may accommodate actual entry of the piston face 172 into the mold cavity 190. Thus, a completed article is made regardless of the position of the mold face 172 at completion of the molding cycle and no external stops are provided for the piston. Thus, all of the advantages heretofore described in connection with the stopping of the injection piston solely upon the material will be obtained.

After the article 170 has been formed in a mold cavity 190, the actuating rod 194 is retracted to thereby move the mold block 191 from its position of FIGURE 12 to its position of FIGURE 13. At this time, the stripper pins 197 enter the mold cavity 190 by virtue of their abutment with the stop 198 and the article 170 is stripped from the mold cavity 190 as indicated in FIGURE 13, the article 170 being free to drop from its stripped position intermediate the feed block 174 and the mold block 191 by gravity or being removed by other means.

It will readily be appreciated that the piston 171 is cooled internally over its full length by its contact with the coolant block 181 and that the piston is heated only by its exterior peripheral contact with the supply block 174. By regulation of the cooling supply through line 186 and drain line 187 and by regulation of the amount of heat supplied by the peripheral feed block heaters 175, a desired temperature may be readily obtained within the piston 171 so as to avoid sticking of the material to the forward or molding face 172 thereof. Additionally, the mold cavity 190 is cooled by the internally cooled mold core 200 and the cooled mold block 191.

The embodiments of the invention in which an exclusive property or privilege is claimed, are defined as follows.

What is claimed is:

In a method of injection molding a cup-shaped article having peripheral side walls extending from an open end at one axial extremity of the article to a closed end at the other axial extremity, the steps of peripherally enclosing a central mold core in a surrounding outer mold to define therebetween a mold space conforming to the article except for the closed end thereof, the core having an end wall defining the inner surface only of the closed end of the article, depositing a measured charge of plasticized material in an enclosed feed passage axially aligned with the core end wall and spaced therefrom, said feed passage conforming in size and shape to the core end wall, displacing through said passage an injection piston having an end face fitting snugly in said passage and substantially conforming to said core end wall, displacement of said piston introducing the measured charge into the mold space and closing the mold space with the end face of the piston in confrontingly spaced relation to the end wall of the core, said core end wall and said piston end face defining therebetween that portion of said mold space filled with plasticized material which forms the closed wall of said article, retaining said piston end face, said outer mold and said core in their relative closed positions to at least partially chill said article, and thereafter retracting said piston and relatively moving said outer mold and said core to expose the article on said core.

References Cited in the file of this patent

UNITED STATES PATENTS

| | | |
|---|---|---|
| 2,469,342 | Richardson | May 3, 1949 |
| 2,746,089 | Hendry | May 22, 1956 |

FOREIGN PATENTS

| | | |
|---|---|---|
| 955,413 | France | June 27, 1949 |
| 437,337 | Germany | Nov. 19, 1926 |